(12) United States Patent
Liu et al.

(10) Patent No.: US 8,730,178 B2
(45) Date of Patent: May 20, 2014

(54) TOUCH SCREEN

(75) Inventors: Chen-Yu Liu, Jhongli (TW); Ching-Yi Wang, Jhongli (TW)

(73) Assignee: TPK Touch Solutions Inc., Taipei (TW)

( * ) Notice: Subject to any disclaimer, the term of this patent is extended or adjusted under 35 U.S.C. 154(b) by 666 days.

(21) Appl. No.: 12/179,593

(22) Filed: Jul. 25, 2008

(65) Prior Publication Data

US 2009/0295752 A1 Dec. 3, 2009

(30) Foreign Application Priority Data

May 30, 2008 (TW) ................................ 97209523 U

(51) Int. Cl.
*G06F 3/041* (2006.01)

(52) U.S. Cl.
USPC .................. 345/173; 345/156; 178/18.01

(58) Field of Classification Search
CPC .... G06G 3/041; G06G 3/0412; G02F 1/3338; G02F 1/1333; G02F 1/133512; G02F 1/133528; G06F 2203/04111; G06F 2203/04412
USPC ................ 345/173, 174; 349/96, 117; 341/33
See application file for complete search history.

(56) References Cited

U.S. PATENT DOCUMENTS

| | | | | |
|---|---|---|---|---|
| 4,394,643 | A * | 7/1983 | Williams | 341/33 |
| 6,876,355 | B1 * | 4/2005 | Ahn et al. | 345/173 |
| 6,879,319 | B2 * | 4/2005 | Cok | 345/173 |
| 7,268,770 | B1 * | 9/2007 | Takahata et al. | 345/173 |
| 2006/0001800 | A1 * | 1/2006 | Sanelle et al. | 349/96 |
| 2006/0227114 | A1 * | 10/2006 | Geaghan et al. | 345/173 |
| 2007/0008471 | A1 * | 1/2007 | Wang et al. | 349/117 |
| 2007/0159561 | A1 * | 7/2007 | Chien | 349/12 |
| 2008/0062148 | A1 * | 3/2008 | Hotelling et al. | 345/174 |
| 2009/0002337 | A1 * | 1/2009 | Chang | 345/174 |

* cited by examiner

*Primary Examiner* — Quan-Zhen Wang
*Assistant Examiner* — Troy Dalrymple
(74) *Attorney, Agent, or Firm* — Gokalp Bayramoglu

(57) ABSTRACT

A touch screen includes a liquid crystal layer, an upper transparent conductive layer, a lower transparent conductive layer, an upper transparent plate, a lower transparent plate, an upper polarizing plate, a lower polarizing plate and a circuit unit. The upper transparent conductive layer, the upper transparent plate, the circuit unit and the upper polarizing plate are disposed on the liquid crystal layer in the above-mentioned order from one side of the liquid crystal layer. The lower transparent conductive layer, the lower transparent plate and the lower polarizing plate are disposed under the liquid crystal layer in the above-mentioned order from another side of the liquid crystal layer.

26 Claims, 10 Drawing Sheets

TOUCH SCREEN

BACKGROUND

The present invention relates to touch screens, and in particular relates to a capacitive touch screen.

In recent years, there has been an increase in demand for electronic devices, such as personal digital assistants (PDAs), mobile phones, and information appliances. To facilitate the users' input, many electronic devices employ touch panels as inputting devices.

Referring to FIG. 1, a conventional touch screen is shown. The touch screen includes a liquid crystal panel 1c, a touch panel 5, and an adhesive layer 6 between the liquid crystal panel 1c and the touch panel 5.

The touch panel 5 includes a glass plate 51, a first circuit layer 52, a transparent dielectric layer 54, a second circuit layer 53 and a transparent over coat 55 in the above-mentioned order from an outer surface of the touch screen. The first circuit layer 52 and the second circuit layer 53 can be made of indium-tin oxide (ITO). The transparent over coat 55 is dielectric, which is connected to the adhesive layer 6. The transparent over coat 55 is used for preventing the second circuit layer 53 from being damaged/scratched. The transparent over coat 55 can be made of silicon nitride or silicon dioxide.

The liquid crystal panel 1c includes a liquid crystal layer 15c, an upper glass plate 11c, an upper transparent conductive layer 12c, a lower glass plate 13c, a lower transparent conductive layer 14c, an upper polarizing plate 16c and a lower polarizing plate 17c. The upper transparent conductive layer 12c, the upper glass plate 11c and the upper polarizing plate 16c are deposed on the liquid crystal layer 15c in the above-mentioned order, and the upper polarizing plate 16c is connected to the adhesive layer 6. The lower transparent conductive layer 14c, the lower glass plate 13c and the lower polarizing plate 17c are positioned under the liquid crystal layer 15c in the above-mentioned order.

By a pen or a finger pressing at images or letter icons generated from the liquid crystal panel 1c on the outer surface of the touch screen, the user can input signals into the touch screen.

Generally, in a process of manufacturing the touch screen, the touch panel 5 and the liquid crystal panel 1c are made separately at first, and then the touch panel 5 and the liquid crystal panel 1c are assembled together. However, the process of assembling the touch panel 5 and the liquid crystal panel 1c requires high precision and costs time. In addition, the touch screen has a relatively high thickness.

What is needed, therefore, is a new touch screen that can overcome the above-mentioned shortcomings.

BRIEF SUMMARY

A touch screen includes a liquid crystal layer, an upper transparent conductive layer, a lower transparent conductive layer, an upper transparent plate, a lower transparent plate, an upper polarizing plate, a lower polarizing plate and a circuit unit. The upper transparent conductive layer, the upper transparent plate, the circuit unit and the upper polarizing plate are disposed on the liquid crystal layer in the above-mentioned order from one side of the liquid crystal layer. The lower transparent conductive layer, the lower transparent plate and the lower polarizing plate are disposed under the liquid crystal layer in the above-mentioned order from another side of the liquid crystal layer.

A touch screen includes a liquid crystal layer, an upper transparent conductive layer, a lower transparent conductive layer, an upper transparent plate, a lower transparent plate, an upper polarizing plate, a lower polarizing plate, a first circuit layer, a second circuit layer and a fourth dielectric layer. The upper transparent conductive layer, the fourth dielectric layer, the second circuit layer, the upper transparent plate, the first circuit layer and the upper polarizing plate are disposed on the liquid crystal layer in the above-mentioned order from one side of the liquid crystal layer. The lower transparent conductive layer, the lower transparent plate and the lower polarizing plate are disposed under the liquid crystal layer in the above-mentioned order from another side of the liquid crystal layer.

A touch screen includes a liquid crystal layer, an upper transparent conductive layer, a lower transparent conductive layer, an upper transparent plate, a lower transparent plate, an upper polarizing plate, a lower polarizing plate, a circuit unit and a seventh dielectric layer. The upper transparent conductive layer, the seventh dielectric layer, the circuit unit, the upper transparent plate and the upper polarizing plate are disposed on the liquid crystal layer in the above-mentioned order from one side of the liquid crystal layer. The lower transparent conductive layer, the lower transparent plate and the lower polarizing plate are disposed under the liquid crystal layer in the above-mentioned order from another side of the liquid crystal layer.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe various exemplary embodiments of the present touch screen in detail.

Figure 1:
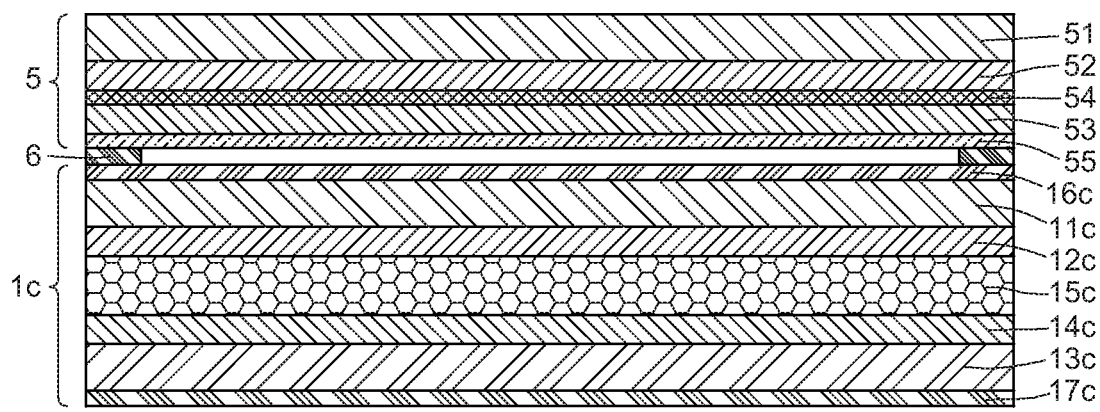
FIG. 1 is a schematic, cross-sectional view of a conventional touch screen.
Figure 2:
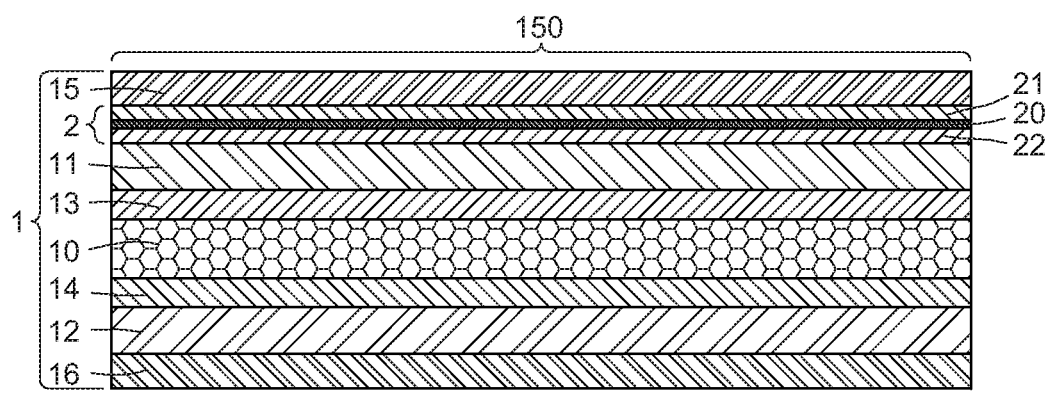
FIG. 2 is a schematic, cross-sectional view of a touch screen according to a first exemplary embodiment.

Referring to FIG. 2, a touch screen 1 according to a first exemplary embodiment is shown. The touch screen 1 includes a liquid crystal layer 10, an upper transparent plate 11, a lower transparent plate 12, an upper transparent conductive layer 13, a lower transparent conductive layer 14, an upper polarizing plate 15, a lower polarizing plate 16 and a circuit unit 2. The upper transparent conductive layer 13, the upper transparent plate 11, the circuit unit 2 and the upper polarizing plate 15 are disposed on the liquid crystal layer 10 in the above-mentioned order from one side of the liquid crystal layer 10. A display region 150 is defined on the upper polarizing plate 15. The lower transparent conductive layer 14, the lower transparent plate 12 and the lower polarizing plate 16 are disposed under the liquid crystal layer 10 in the above-mentioned order from another side of the liquid crystal layer 10. In addition, the circuit unit 2 includes a first circuit layer 21 adjacent to the upper polarizing plate 15, a second circuit layer 22 adjacent to the upper transparent plate 11 and a first dielectric layer 20 located between the first circuit layer 21 and the second circuit layer 22.

Figure 3:
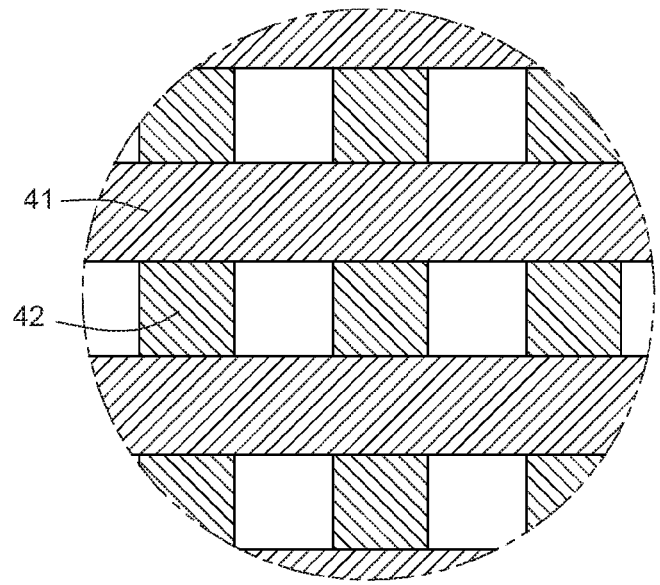
FIGS. 3 and 4 are schematic, partially views of a first circuit layer and a second circuit layer of the touch screen of FIG. 2.
Figure 4:
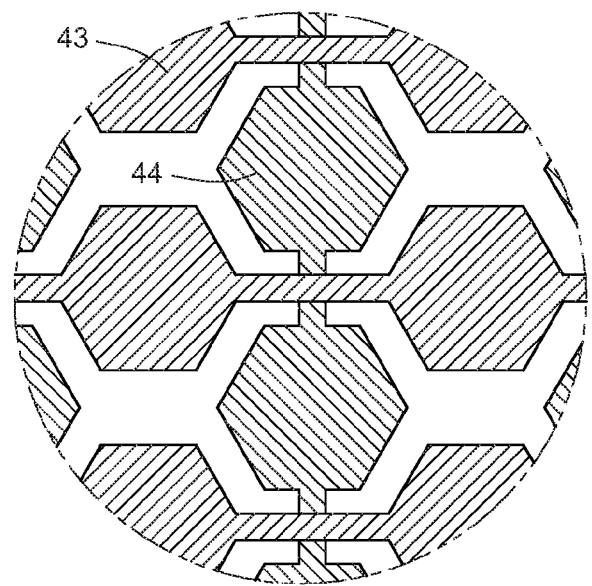

Referring to FIGS. 3 and 4, the first circuit layer 21 and the second circuit layer 22 include a plurality of electrodes 41, 42, 43, 44. The electrodes 41, 43 of the first circuit layer 21 are configured for touch sensing in a first axial direction. The electrodes 42, 44 of the second circuit layer 22 are configured for touch sensing in a second axial direction that is perpendicular to the first axial direction. The electrodes 41, 42, 43, 44 can have same width or different width.

Each of the upper transparent plate 11 and the lower transparent plate 12 can be made of a material selected from a group consisting of glass, plastic or other dielectric materials. The first circuit layer 21 or the second circuit layer 22 can be made of a transparent electric material, such as indium-tin oxide. The first circuit layer 21 and the second circuit layer 22 can be formed by a method including: coating, exposing, developing and etching.

The images or letter icons can display on the display region 150. If a finger or other electric body presses at a position on the display region 150, the first circuit layer 21 and the second circuit layer 22 corresponding to the position would be induced by the finger or other electric body to generate a capacitive effect. In this way, induction signals are generated, and transmitted to an external processor (not shown). The external processor computes the induction signals to achieve a purpose of touch control.

Because the touch screen 1 includes the first circuit layer 21 and the second circuit layer 22 on the upper transparent plate 11, a conventional touch panel can be omitted. Therefore a process of assembly of the touch screen 1 is simplified, and an efficiency of assembly is improved. Furthermore, some materials, such as a glass plate of the conventional touch panel, can be omitted, thus a thickness of the touch screen 1 is reduced, so as to meet the design trend of thinness of the electronic devices. In addition, because the glass plate of the conventional touch panel can be omitted and the efficiency of assembly is improved, the production cost of touch screen 1 is relatively low.

It should be pointed out that the upper transparent conductive layer 13 can be used as a shielding layer. The shielding layer may reject noise. The first circuit layer 21 and the second circuit layer 22 can be made of an opaque metal, so as to replace a black matrix layer of a conventional screen for blocking light. The opaque metal can be chromium (Cr).

In addition, an added transparent shielding layer can be configured between the second circuit layer 22 and the upper transparent conductive layer 13. The shielding layer is dielectric with the second circuit layer 22 and the upper transparent conductive layer 13. The shielding layer may reject noise, thereby isolating electromagnetism interference of driving the touch screen 1. The shielding layer can be made of an opaque metal, so as to replace a black matrix layer of a conventional screen for blocking light.

Figure 5:
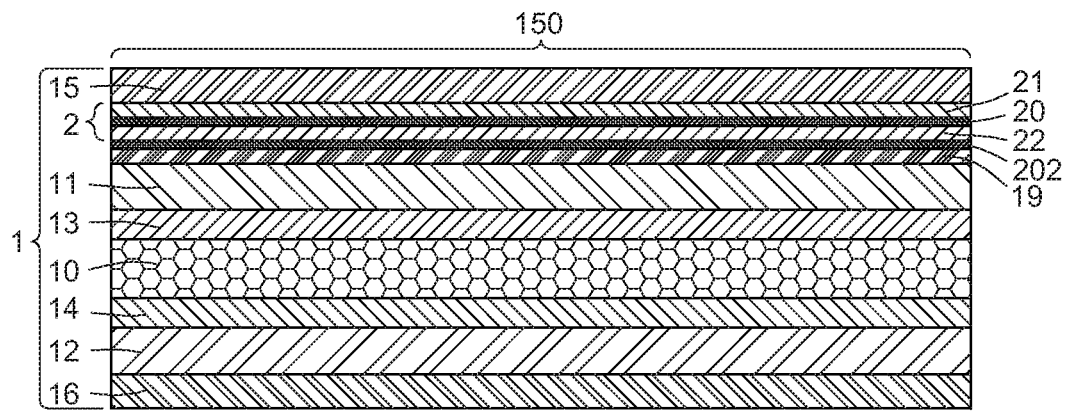
FIGS. 5 through 19 are schematic, cross-sectional views of touch screens according to second to sixteenth exemplary embodiments correspondingly.

Referring to FIG. 5, a touch screen 1 according to a second exemplary embodiment is shown. The touch screen 1 of the second exemplary embodiment is similar in principle to the touch screen 1 of the first exemplary embodiment described above, and also includes a liquid crystal layer 10, an upper transparent plate 11, a lower transparent plate 12, an upper transparent conductive layer 13, a lower transparent conductive layer 14, an upper polarizing plate 15, a lower polarizing plate 16 and a circuit unit 2. The circuit unit 2 includes a first circuit layer 21, a second circuit layer 22 and a first dielectric layer 20. However, the touch screen 1 of the second exemplary embodiment further includes a shielding layer 19 and a second dielectric layer 202. The shielding layer 19 is located between the second circuit layer 22 and the upper transparent plate 11. The second dielectric layer 202 is transparent, which is located between the second circuit layer 22 and the shielding layer 19. The first circuit layer 21 and the second circuit layer 22 can be made of an opaque metal, so as to replace a black matrix layer of a conventional screen for blocking light.

Figure 6:
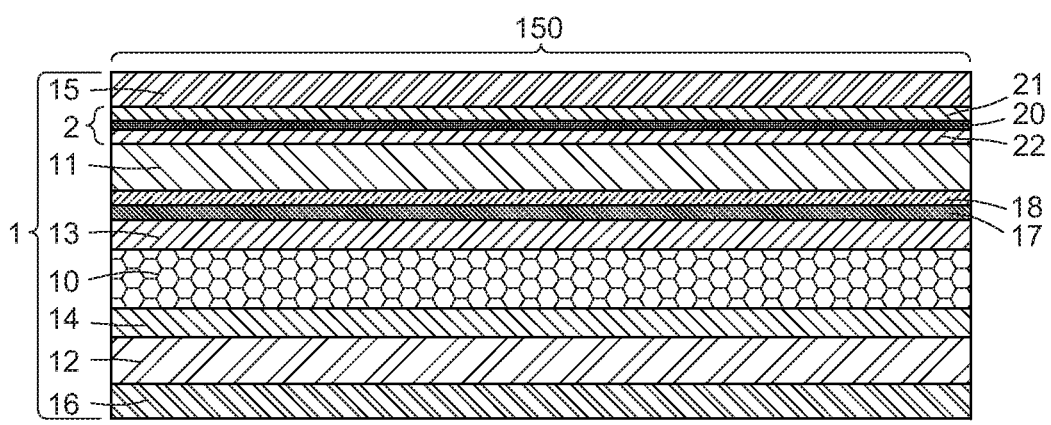

Referring to FIG. 6, a touch screen 1 according to a third exemplary embodiment is shown. The touch screen 1 of the third exemplary embodiment is similar in principle to the touch screen 1 of the first exemplary embodiment described above, and also includes a liquid crystal layer 10, an upper transparent plate 11, a lower transparent plate 12, an upper transparent conductive layer 13, a lower transparent conductive layer 14, an upper polarizing plate 15, a lower polarizing plate 16 and a circuit unit 2. The circuit unit 2 includes a first circuit layer 21, a second circuit layer 22 and a first dielectric layer 20. However, the touch screen 1 of the third exemplary embodiment further includes a color resist layer 17 and a blocking layer 18. The color resist layer 17 is located between the upper transparent plate 11 and the upper transparent conductive layer 13. The blocking layer 18 is opaque, which is located between the upper transparent plate 11 and the color resist layer 17. The blocking layer 18 can be used as a black matrix layer or other coating for blocking light, so as to replace a black matrix layer of a conventional screen for blocking light. In addition, the upper transparent conductive layer 13 can be used as a shielding layer.

Figure 7:
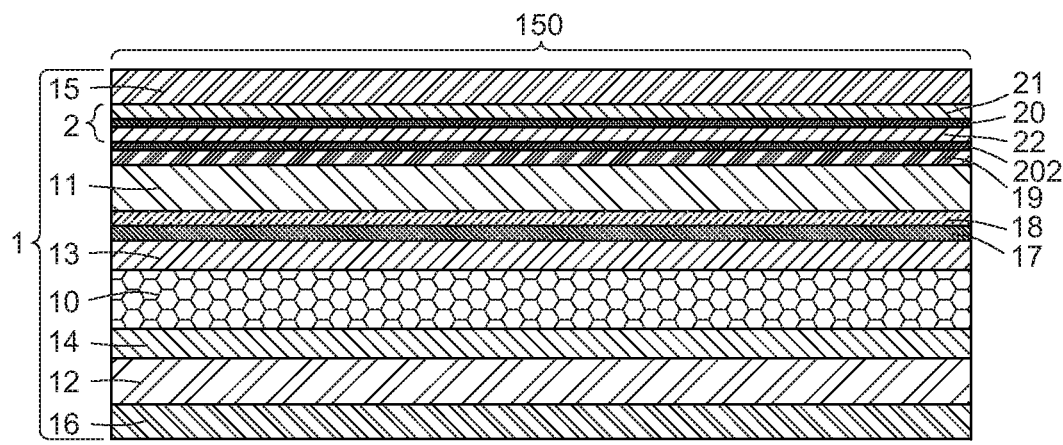

Referring to FIG. 7, a touch screen 1 according to a fourth exemplary embodiment is shown. The touch screen 1 of the fourth exemplary embodiment is similar in principle to the touch screen 1 of the second exemplary embodiment described above, and also includes a liquid crystal layer 10, an upper transparent plate 11, a lower transparent plate 12, an upper transparent conductive layer 13, a lower transparent conductive layer 14, an upper polarizing plate 15, a lower polarizing plate 16, a circuit unit 2, a shielding layer 19 and a second dielectric layer 202. The circuit unit 2 includes a first circuit layer 21, a second circuit layer 22 and a first dielectric layer 20. However, the touch screen 1 of the fourth exemplary embodiment further includes a color resist layer 17 and a blocking layer 18. The color resist layer 17 is located between the upper transparent plate 11 and the upper transparent conductive layer 13. The blocking layer 18 is opaque, which is located between the upper transparent plate 11 and the color resist layer 17. The blocking layer 18 can be used as a black matrix layer or other coating for blocking light.

Figure 8:
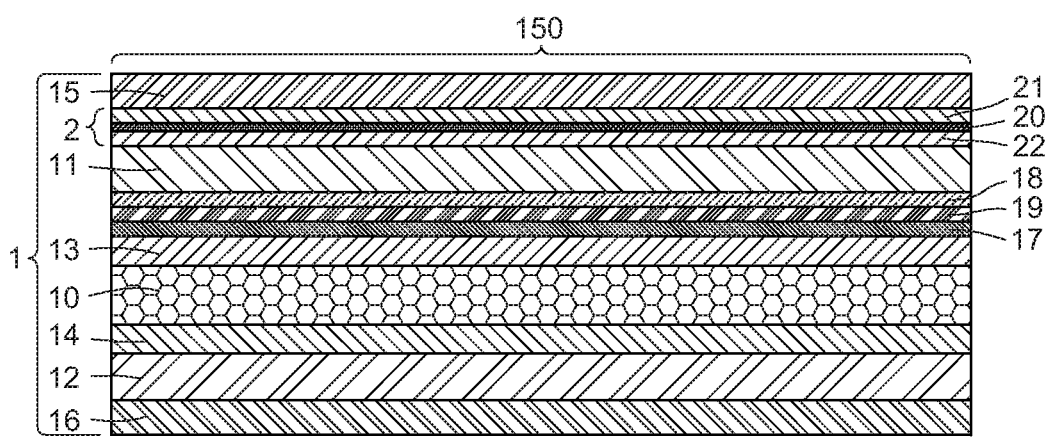

Referring to FIG. 8, a touch screen 1 according to a fifth exemplary embodiment is shown. The touch screen 1 of the fifth exemplary embodiment is similar in principle to the touch screen 1 of the third exemplary embodiment described above, and also includes a liquid crystal layer 10, an upper transparent plate 11, a lower transparent plate 12, an upper transparent conductive layer 13, a lower transparent conductive layer 14, an upper polarizing plate 15, a lower polarizing plate 16, a circuit unit 2, a color resist layer 17 and a blocking layer 18. The circuit unit 2 includes a first circuit layer 21, a second circuit layer 22 and a first dielectric layer 20. However, the touch screen 1 of the fifth exemplary embodiment further includes a shielding layer 19 located between the color resist layer 17 and the blocking layer 18.

Figure 9:
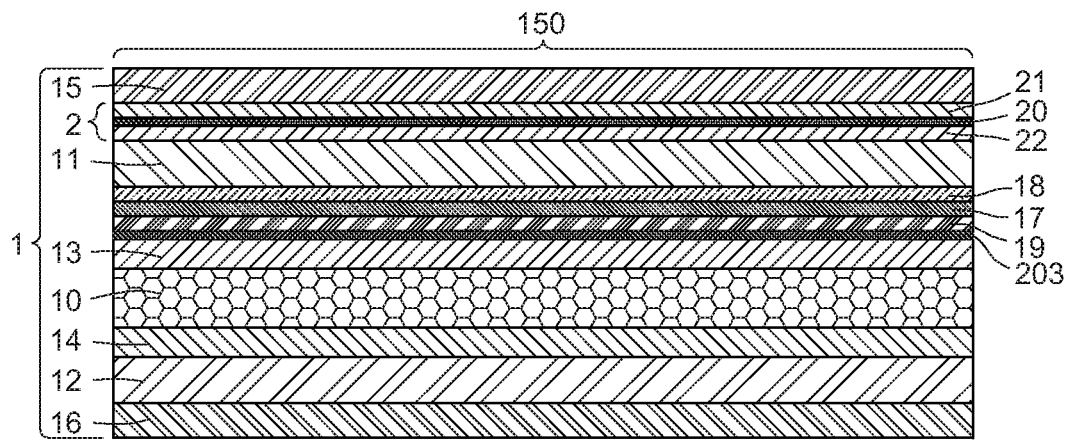

Referring to FIG. 9, a touch screen 1 according to a sixth exemplary embodiment is shown. The touch screen 1 of the six exemplary embodiment is similar in principle to the touch screen 1 of the third exemplary embodiment described above, and also includes a liquid crystal layer 10, an upper transparent plate 11, a lower transparent plate 12, an upper transparent conductive layer 13, a lower transparent conductive layer 14, an upper polarizing plate 15, a lower polarizing plate 16, a circuit unit 2, a color resist layer 17 and a blocking layer 18. The circuit unit 2 includes a first circuit layer 21, a second circuit layer 22 and a first dielectric layer 20. However, the touch screen 1 of the six exemplary embodiment further includes a shielding layer 19 and a third dielectric layer 203. The shielding layer 19 is located between the color resist layer 17 and upper transparent conductive layer 13. The third dielectric layer 203 is located between the shielding layer 19 and upper transparent conductive layer 13.

Figure 10:
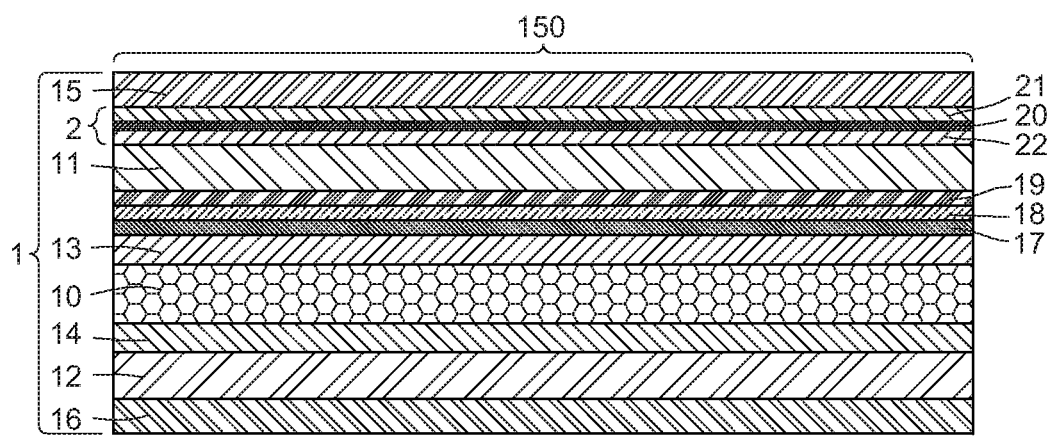

Referring to FIG. 10, a touch screen 1 according to a seventh exemplary embodiment is shown. The touch screen 1 of the seventh exemplary embodiment is similar in principle to the touch screen 1 of the third exemplary embodiment described above, and also includes a liquid crystal layer 10, an upper transparent plate 11, a lower transparent plate 12, an upper transparent conductive layer 13, a lower transparent conductive layer 14, an upper polarizing plate 15, a lower polarizing plate 16, a circuit unit 2, a color resist layer 17 and a blocking layer 18. The circuit unit 2 includes a first circuit layer 21, a second circuit layer 22 and a first dielectric layer 20. However, the touch screen 1 of the seventh exemplary embodiment further includes a shielding layer 19 located between the upper transparent plate 11 and the blocking layer 18.

Figure 11:
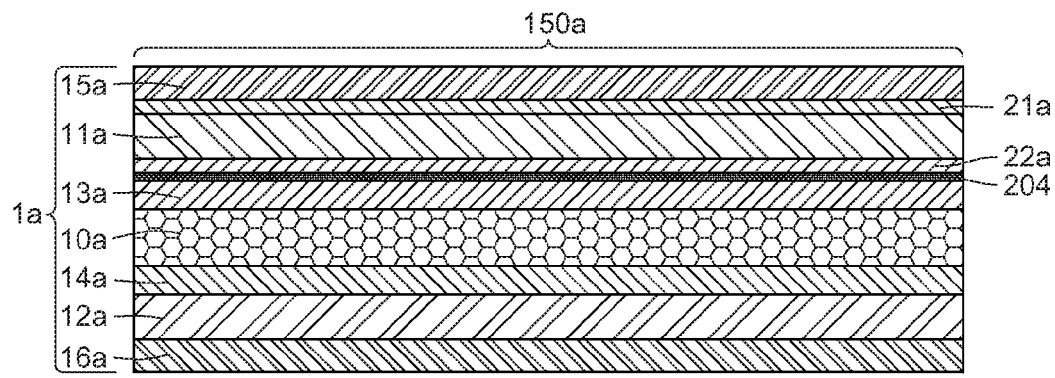

Referring to FIG. 11, a touch screen 1a according to an eighth exemplary embodiment is shown. The touch screen 1a includes a liquid crystal layer 10a, an upper transparent plate 11a, a lower transparent plate 12a, an upper transparent conductive layer 13a, a lower transparent conductive layer 14a, an upper polarizing plate 15a, a lower polarizing plate 16a, a first circuit layer 21a, a second circuit layer 22a and a fourth dielectric layer 204. The upper transparent conductive layer 13a, the fourth dielectric layer 204, the second circuit layer 22a, the upper transparent plate 11a, the first circuit layer 21a and the upper polarizing plate 15a are disposed on the liquid crystal layer 10a in the above-mentioned order from one side of the liquid crystal layer 10a. A display region 150a is defined on the upper polarizing plate 15a. The lower transparent conductive layer 14a, the lower transparent plate 12a and the lower polarizing plate 16a are disposed under the liquid crystal layer 10a in the above-mentioned order from another side of the liquid crystal layer 10a. In addition, the upper transparent plate 11a can be used as a dielectric layer.

The first circuit layer 21a and the second circuit layer 22a include a plurality of electrodes 41, 42, 43, 44, as shown in FIGS. 3 and 4. The electrodes 41, 43 of the first circuit layer 21a are configured for touch sensing in a first axial direction. The electrodes 42, 44 of the second circuit layer 22a are configured for touch sensing in a second axial direction that is perpendicular to the first axial direction.

Each of the upper transparent plate 11a and the lower transparent plate 12a can be made of a material selected from a group consisting of glass, plastic or other dielectric materials. The first circuit layer 21a or the second circuit layer 22a can be made of a transparent electric material, such as indium-tin oxide. The first circuit layer 21a and the second circuit layer 22a can be formed by a method including: coating, exposing, developing and etching.

The images or letter icons can display on the display region 150a. If a finger or other electric body presses at a position on the display region 150a, the first circuit layer 21a and the second circuit layer 22a corresponding to the position would be induced by the finger or other electric body to generate a capacitive effect. In this way, induction signals are generated, and transmitted to an external processor (not shown). The external processor computes the induction signals to achieve a purpose of touch control.

Because the touch screen 1a includes the first circuit layer 21a and the second circuit layer 22a on the opposite sides of the upper transparent plate 11a, a conventional touch panel can be omitted. Therefore a process of assembly of the touch screen 1a is simplified, and an efficiency of assembly is improved. Furthermore, some materials, such as a glass plate of the conventional touch panel, can be omitted, thus a thickness of the touch screen 1a is reduced, so as to meet the design trend of thinness of the electronic devices. In addition, because the glass plate of the conventional touch panel can be omitted and the efficiency of assembly is improved, the production cost of touch screen 1a is relatively low.

It should be pointed out that the upper transparent conductive layer 13a can be used as a shielding layer. The first circuit layer 21a and the second circuit layer 22a can be made of an opaque metal, so as to replace a black matrix layer of a conventional screen for blocking light. The opaque metal can be chromium.

In addition, an added transparent shielding layer can be configured between the second circuit layer 22a and the upper transparent conductive layer 13a. The shielding layer is dielectric with the second circuit layer 22a and the upper transparent conductive layer 13a. The shielding layer may reject noise, thereby isolating electromagnetism interference of driving the touch screen 1a. The shielding layer can be made of an opaque metal, so as to replace a black matrix layer of a conventional screen for blocking light.

Figure 12:
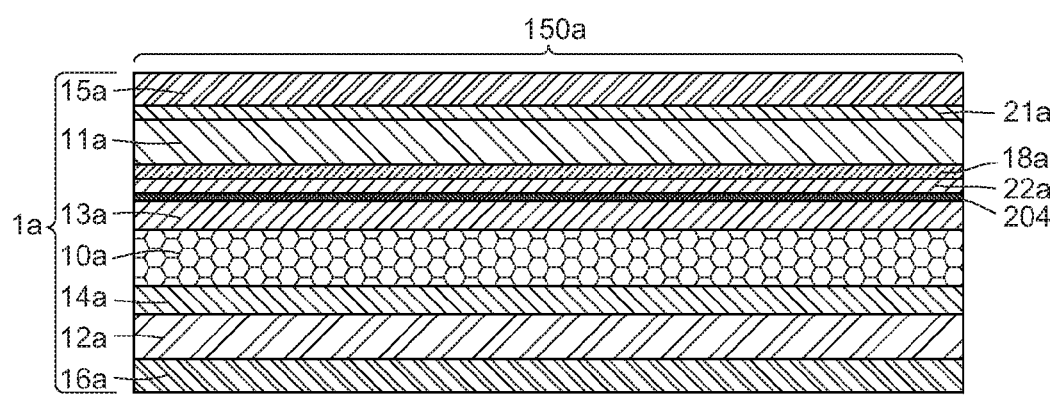

Referring to FIG. 12, a touch screen 1a according to a ninth exemplary embodiment is shown. The touch screen 1a of the ninth exemplary embodiment is similar in principle to the touch screen 1 of the eighth exemplary embodiment described above, and also includes a liquid crystal layer 10a, an upper transparent plate 11a, a lower transparent plate 12a, an upper transparent conductive layer 13a, a lower transparent conductive layer 14a, an upper polarizing plate 15a, a lower polarizing plate 16a, a first circuit layer 21a, a second circuit layer 22a and a fourth dielectric layer 204. However, the touch screen 1a of the ninth exemplary embodiment further includes a blocking layer 18a, and the fourth dielectric layer 204 is used as a color resist layer. The blocking layer 18a is located between the upper transparent plate 11a and the second circuit layer 22a. The blocking layer 18a can be used as a black matrix layer or other coating for blocking light, so as to replace a black matrix layer of a conventional screen for blocking light. In addition, the upper transparent conductive layer 13a can be used as a shielding layer.

Figure 13:
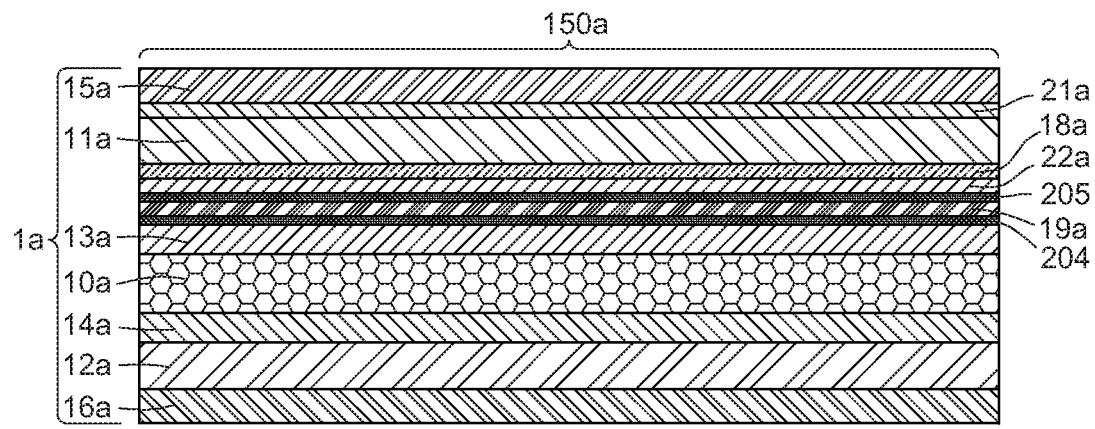

Referring to FIG. 13, a touch screen 1a according to a tenth exemplary embodiment is shown. The touch screen 1a of the tenth exemplary embodiment is similar in principle to the touch screen 1a of the ninth exemplary embodiment described above, and also includes a liquid crystal layer 10a, an upper transparent plate 11a, a lower transparent plate 12a, an upper transparent conductive layer 13a, a lower transparent conductive layer 14a, an upper polarizing plate 15a, a lower polarizing plate 16a, a first circuit layer 21a, a second circuit layer 22a, a fourth dielectric layer 204 and a blocking layer 18a. However, the touch screen 1a of the tenth exemplary embodiment further includes a shielding layer 19a and a fifth dielectric layer 205. The shielding layer 19a is located between the second circuit layer 22a and the fourth dielectric layer 204. The fifth dielectric layer 205 is located between the second circuit layer 22a and the shielding layer 19a.

Figure 14:
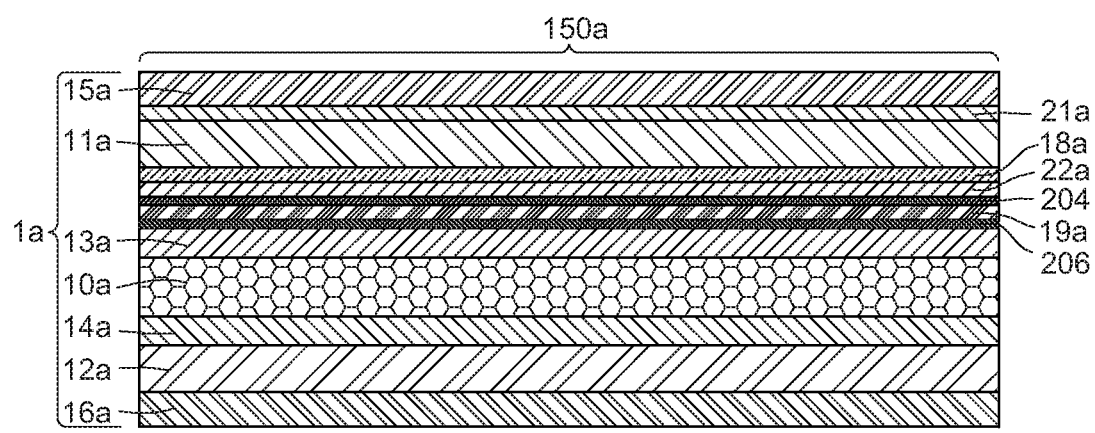

Referring to FIG. 14, a touch screen 1a according to an eleventh exemplary embodiment is shown. The touch screen 1a of the eleventh exemplary embodiment is similar in principle to the touch screen 1a of the ninth exemplary embodiment described above, and also includes a liquid crystal layer 10a, an upper transparent plate 11a, a lower transparent plate 12a, an upper transparent conductive layer 13a, a lower transparent conductive layer 14a, an upper polarizing plate 15a, a lower polarizing plate 16a, a first circuit layer 21a, a second circuit layer 22a, a fourth dielectric layer 204 and a blocking layer 18a. However, the touch screen 1a of the eleventh exemplary embodiment further includes a shielding layer 19a and a sixth dielectric layer 206. The shielding layer 19a is located between the fourth dielectric layer 204 and the upper transparent conductive layer 13a. The sixth dielectric layer 206 is located between the shielding layer 19a and the upper transparent conductive layer 13a.

Figure 15:
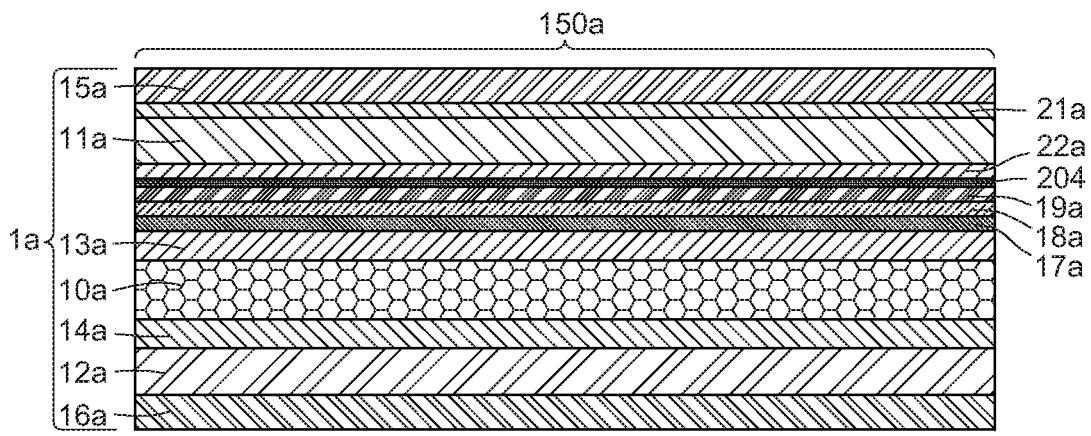

Referring to FIG. 15, a touch screen 1a according to a twelfth exemplary embodiment is shown. The touch screen 1a of the twelfth exemplary embodiment is similar in principle to the touch screen 1a of the eighth exemplary embodiment described above, and also includes a liquid crystal layer 10a, an upper transparent plate 11a, a lower transparent plate 12a, an upper transparent conductive layer 13a, a lower transparent conductive layer 14a, an upper polarizing plate 15a, a lower polarizing plate 16a, a first circuit layer 21a, a second circuit layer 22a and a fourth dielectric layer 204. However, the touch screen 1a of the twelfth exemplary embodiment further includes a color resist layer 17a, a blocking layer 18a and a shielding layer 19a. The color resist layer 17a is located between the fourth dielectric layer 204 and the upper transparent conductive layer 13a. The blocking layer 18a is located between the fourth dielectric layer 204 and the color resist layer 17a. The blocking layer 18a can be used as a black matrix layer or other coating for blocking light, so as to replace a black matrix layer of a conventional screen for blocking light. The shielding layer 19a is located between the fourth dielectric layer 204 and the blocking layer 18a.

Figure 16:
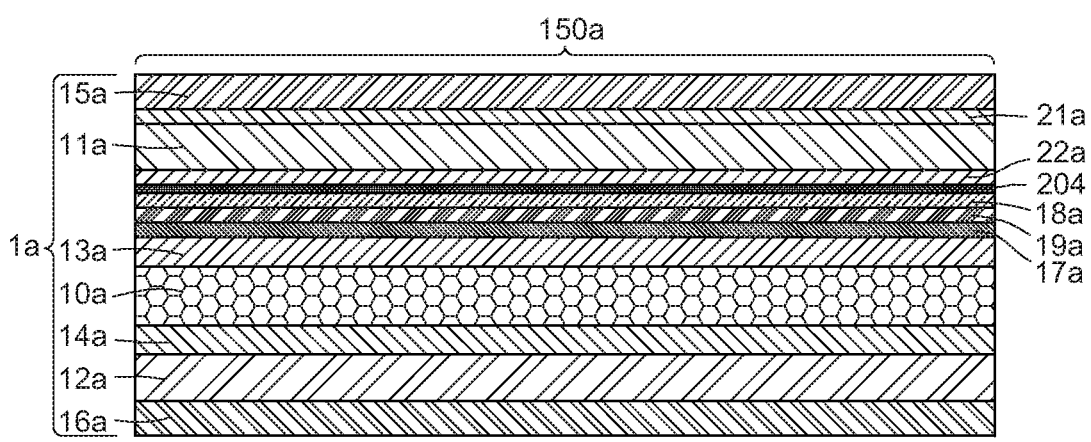

Referring to FIG. 16, a touch screen 1a according to a thirteenth exemplary embodiment is shown. The touch screen 1a of the thirteenth exemplary embodiment is similar in principle to the touch screen 1a of the eighth exemplary embodiment described above, and also includes a liquid crystal layer 10a, an upper transparent plate 11a, a lower transparent plate 12a, an upper transparent conductive layer 13a, a lower transparent conductive layer 14a, an upper polarizing plate 15a, a lower polarizing plate 16a, a first circuit layer 21a, a second circuit layer 22a and a fourth dielectric layer 204. However, the touch screen 1a of the thirteenth exemplary embodiment further includes a color resist layer 17a, a blocking layer 18a and a shielding layer 19a. The color resist layer 17a is located between the fourth dielectric layer 204 and the upper transparent conductive layer 13a. The blocking layer 18a is located between the fourth dielectric layer 204 and the color resist layer 17a. The blocking layer 18a can be used as a black matrix layer or other coating for blocking light, so as to replace a black matrix layer of a conventional screen for blocking light. The shielding layer 19a is located between the color resist layer 17a and the blocking layer 18a.

Figure 17:
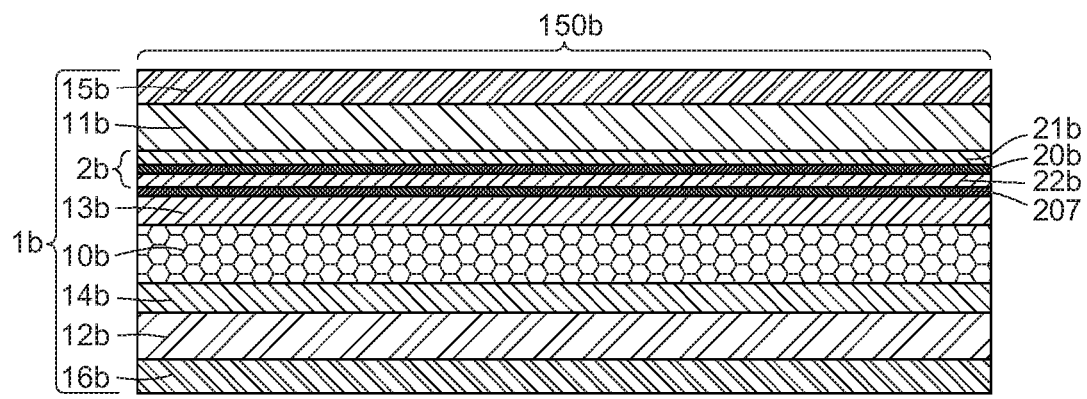

Referring to FIG. 17, a touch screen 1b according to a fourteenth exemplary embodiment is shown. The touch screen 1b includes a liquid crystal layer 10b, an upper transparent plate 11b, a lower transparent plate 12b, an upper transparent conductive layer 13b, a lower transparent conductive layer 14b, an upper polarizing plate 15b, a lower polarizing plate 16b, a circuit unit 2b and a seventh dielectric layer 207. The upper transparent conductive layer 13b, the seventh dielectric layer 207, the circuit unit 2b, the upper transparent plate 11b and the upper polarizing plate 15b are disposed on the liquid crystal layer 10b in the above-mentioned order from one side of the liquid crystal layer 10b. A display region 150b is defined on the upper polarizing plate 15b. The lower transparent conductive layer 14b, the lower transparent plate 12b and the lower polarizing plate 16b are disposed under the liquid crystal layer 10b in the above-mentioned order from another side of the liquid crystal layer 10b. In addition, the circuit unit 2b includes a first circuit layer 21b adjacent to upper transparent plate 11b, a second circuit layer 22b adjacent to the seventh dielectric layer 207 and a first dielectric layer 20b located between the first circuit layer 21b and the second circuit layer 22b.

The first circuit layer 21b and the second circuit layer 22b include a plurality of electrodes 41, 42, 43, 44, as shown in FIGS. 3 and 4. The electrodes 41, 43 of the first circuit layer 21b are configured for touch sensing in a first axial direction. The electrodes 42, 44 of the second circuit layer 22b are configured for touch sensing in a second axial direction that is perpendicular to the first axial direction.

Each of the upper transparent plate 11b and the lower transparent plate 12b can be made of a material selected from a group consisting of glass, plastic or other dielectric materials. The first circuit layer 21b or the second circuit layer 22b can be made of a transparent electric material, such as indium-tin oxide. The first circuit layer 21b and the second circuit layer 22b can be formed by a method including: coating, exposing, developing and etching.

The images or letter icons can display on the display region 150b. If a finger or other electric body presses at a position on the display region 150b, the first circuit layer 21b and the second circuit layer 22b corresponding to the position would be induced by the finger or other electric body to generate a capacitive effect. In this way, induction signals are generated, and transmitted to an external processor (not shown). The external processor computes the induction signals to achieve a purpose of touch control.

Because the touch screen 1b includes the first circuit layer 21b, the second circuit layer 22b and the first dielectric layer 20b under the upper transparent plate 11b, a conventional touch panel can be omitted. Therefore a process of assembly of the touch screen 1b is simplified, and an efficiency of assembly is improved. Furthermore, some materials, such as a glass plate of the conventional touch panel, can be omitted, thus a thickness of the touch screen 1b is reduced, so as to meet the design trend of thinness of the electronic devices. In addition, because the glass plate of the conventional touch panel can be omitted and the efficiency of assembly is improved, the production cost of touch screen 1b is relatively low.

It should be pointed out that the upper transparent conductive layer 13b can be used as a shielding layer. The first circuit layer 21b and the second circuit layer 22b can be made of an opaque metal, so as to replace a black matrix layer of a conventional screen for blocking light. The opaque metal can be chromium.

In addition, an added transparent shielding layer can be configured between the second circuit layer 22b and the upper transparent conductive layer 13b. The shielding layer is dielectric with the second circuit layer 22b and the upper transparent conductive layer 13b. The shielding layer may reject noise, thereby isolating electromagnetism interference of driving the touch screen 1b. The shielding layer can be made of an opaque metal, so as to replace a black matrix layer of a conventional screen for blocking light.

Figure 18:
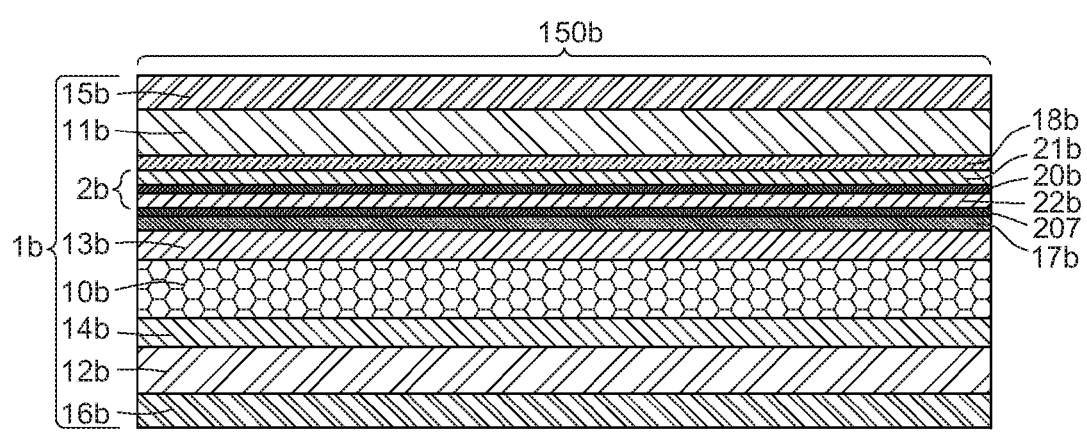

Referring to FIG. 18, a touch screen 1b according to a fifteenth exemplary embodiment is shown. The touch screen 1b of the fifteenth exemplary embodiment is similar in principle to the touch screen 1b of the fourteenth exemplary embodiment described above, and also includes a liquid crystal layer 10b, an upper transparent plate 11b, a lower transparent plate 12b, an upper transparent conductive layer 13b, a lower transparent conductive layer 14b, an upper polarizing plate 15b, a lower polarizing plate 16b, a circuit unit 2b and a seventh dielectric layer 207. The circuit unit 2b includes a first circuit layer 21b, a second circuit layer 22b and a first dielectric layer 20b. However, the touch screen 1b of the fifteenth exemplary embodiment further includes a color resist layer 17b and a blocking layer 18b. The color resist layer 17b is located between the seventh dielectric layer 207 and the upper transparent conductive layer 13b. The blocking layer 18b is located between the upper transparent plate 11b and the first circuit layer 21b. The blocking layer 18b can be used as a black matrix layer or other coating for blocking light, so as to replace a black matrix layer of a conventional screen for blocking light. In addition, the upper transparent conductive layer 13b can be used as a shielding layer.

Figure 19:
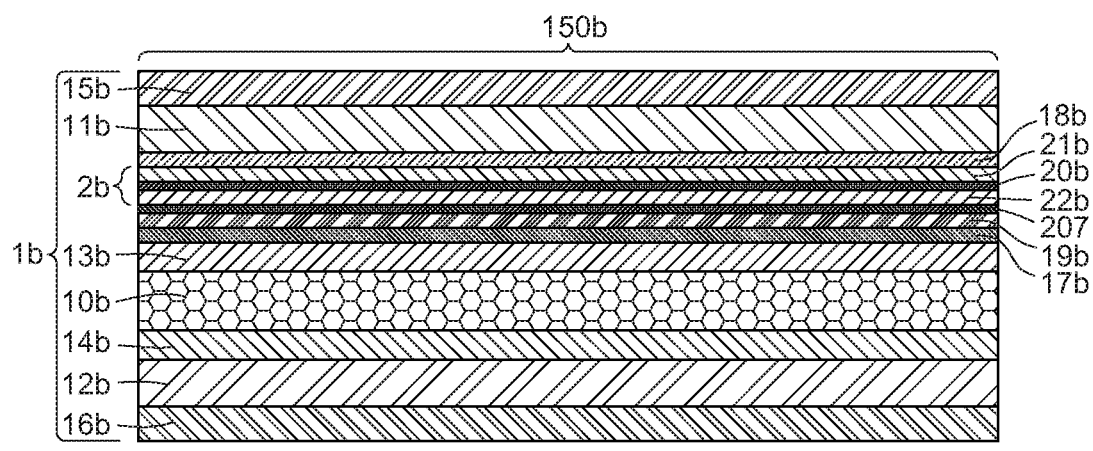

Referring to FIG. 19, a touch screen 1b according to a sixteenth exemplary embodiment is shown. The touch screen 1b of the sixteenth exemplary embodiment is similar in principle to the touch screen 1b of the fifteenth exemplary embodiment described above, and also includes a liquid crystal layer 10b, an upper transparent plate 11b, a lower transparent plate 12b, an upper transparent conductive layer 13b, a lower transparent conductive layer 14b, an upper polarizing plate 15b, a lower polarizing plate 16b, a circuit unit 2b, a seventh dielectric layer 207, a color resist layer 17b and a blocking layer 18b. The circuit unit 2b includes a first circuit layer 21b, a second circuit layer 22b and a first dielectric layer 20b. However, the touch screen 1b of the sixteenth exemplary embodiment further includes a shielding layer 19b. The shielding layer 19b is located between the seventh dielectric layer 207 and the color resist layer 17b.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch screen comprising:
an upper polarizing plate;
a first multi-function unit disposed under the upper polarizing plate and providing
a touch sensing function and a light-blocking function, wherein the first multi-function unit has a first circuit layer, a second circuit layer and a shielding layer, the first circuit layer is electrically insulated from the second circuit layer, with at least one of the first and the second circuit layers made of an opaque metal, and the shielding layer disposed under the second circuit layer is made of opaque metal;
an upper transparent plate disposed under the first multi-function unit;
an LCD-driving unit disposed under the upper transparent plate, wherein the
LCD-driving unit composes an upper transparent conductive layer and a lower transparent conductive layer;
a liquid crystal layer sandwiched between the upper transparent conductive layer and the lower transparent conductive layer; and
a lower transparent plate disposed under the lower transparent conductive layer.

2. The touch screen according to claim 1, wherein the shielding layer is disposed between the second circuit layer and the upper transparent plate and is disposed in the display region of the touch screen, wherein the shielding layer is electrically insulated from the second circuit layer of the first multi-function unit.

3. The touch screen according to claim 2, wherein the touch screen further comprises a second dielectric layer located between the second circuit layer of the first multi-function unit and the shielding layer.

4. The touch screen according to claim 3, wherein the first circuit layer or the second circuit layer is made of an opaque, metal, the first circuit layer has electrodes extending along a first axial direction, and the second circuit layer has electrodes extending along a second axial direction.

5. The touch screen according to claim 1, wherein the first circuit layer or the second circuit layer is made of an opaque, metal, the first circuit layer has electrodes extending along a first axial direction, and the second circuit layer has electrodes extending along a second axial direction.

6. The touch screen according to claim 1, wherein the touch screen further comprises a color resist layer located under the upper transparent plate, and a first dielectric layer located between the first circuit layer and the second circuit layer.

7. The touch screen according to claim 6, wherein the shielding layer is located between the color resist layer and the upper transparent plate.

8. The touch screen according to claim 6, further comprising a third dielectric layer, wherein the shielding layer is located between the color resist layer and the upper transparent conductive layer and the third dielectric layer is located between the shielding layer and the upper transparent conductive layer.

9. The touch screen according to claim 6, wherein the shielding layer is electrically insulated from the second circuit layer of the first multi-function unit.

10. The touch screen according to claim 1, wherein the touch screen further comprises a lower polarizing plate disposed under the lower transparent plate.

11. A touch screen comprising:
an upper polarizing plate,
an upper transparent plate disposed under the upper polarizing plate,
a first multi-function unit providing a touch sensing function and a light-blocking function, wherein the first multi-function unit has a first circuit layer, a second circuit layer and a shielding layer, the first and the second circuit layers are disposed on the opposite surfaces of the upper transparent plate, with at least one of the first and the second circuit layers made of an opaque metal, and the shielding layer disposed under the second circuit layer is made of opaque metal,
an LCD-driving unit disposed under the first multi-function unit, wherein the LCD-driving unit comprises an upper transparent conductive layer and a lower transparent conductive layer, and the upper transparent conductive layer is electrically insulated from the first multi-function unit,
a liquid crystal layer sandwiched between the upper transparent conductive layer and the lower transparent conductive layer, a lower transparent plate disposed under the lower transparent conductive layer.

12. The touch screen according to claim 11, wherein each of the first circuit layer and the second circuit layer comprises a plurality of electrodes.

13. The touch screen according to claim 11, wherein the shielding layer is electrically insulated from the second circuit layer and the upper transparent conductive layer.

14. The touch screen according to claim 13, wherein the shielding layer is disposed in the display region of the touch screen.

15. The touch screen according to claim 11, wherein the first circuit layer or the second circuit layer is made of an opaque material.

16. The touch screen according to claim 11, further comprising a fourth dielectric layer located between the second circuit layer and the upper transparent conductive layer.

17. The touch screen according to claim 16, wherein the touch screen further comprises a fifth dielectric layer located between the second circuit layer and the shielding layer.

18. The touch screen according to claim 16, wherein the touch screen further comprises a sixth dielectric layer located between the shielding layer and the upper transparent conductive layer.

19. The touch screen according to claim 11, wherein the touch screen further comprises a color resist layer located on the upper transparent conductive layer.

20. The touch screen according to claim 11, wherein the touch screen further comprises a lower polarizing plate disposed under the lower transparent plate.

21. A touch screen comprising:
an upper polarizing plate,
an upper transparent plate disposed under the upper polarizing plate,
a first multi-function unit disposed under the upper transparent plate and
providing a touch sensing function and a light-blocking function, wherein the first multi-function unit has a first circuit layer, a second circuit layer and a shielding layer, the first circuit layer is electrically insulated from the second circuit layer,
with at least one of the first and the second circuit layers made of an opaque metal, and the shielding layer disposed under the second circuit layer is made of opaque metal;
an LCD-driving unit disposed under the first multi-function unit, wherein the LCD-driving unit comprises an upper transparent conductive layer and a lower transparent conductive layer, and the upper transparent conductive layer is electrically insulated from the first multi-function unit;
a liquid crystal layer sandwiched between the upper transparent conductive layer and the lower transparent conductive layer,
a lower transparent plate disposed under the lower transparent conductive layer.

22. The touch screen according to claim 21, wherein the shielding layer is located between the second circuit layer and the upper transparent conductive layer, wherein the shielding layer is disposed in the display region and electrically insulated from the second circuit layer and the upper transparent conductive layer.

23. The touch screen according to claim 21, wherein the touch screen further comprises a lower polarizing plate disposed under the lower transparent plate.

24. The touch screen according to claim 21, wherein the first circuit layer or the second circuit, layer is made of an opaque metal, the first circuit layer has electrodes extended along a first axial direction and the second circuit layer has electrodes extending along a second axial direction.

25. The touch screen according to claim 21, wherein the touch screen further comprises a color resist layer located on the upper transparent conductive layer, and a first dielectric layer located between the first circuit layer and the second circuit layer.

26. The touch screen according to claim 25, wherein the shielding layer located above the color resist layer.

* * * * *